United States Patent
Dörrer et al.

(10) Patent No.: US 7,827,856 B2
(45) Date of Patent: Nov. 9, 2010

(54) ROUGHNESS SCANNER

(75) Inventors: Peggy Dörrer, Göttingen (DE); Josef Ludwig, Northeim (DE); Rainer Ziegenbein, Rosdorf (DE)

(73) Assignee: Carl Mahr Holding GmbH, Göttingen (DE)

( * ) Notice: Subject to any disclaimer, the term of this patent is extended or adjusted under 35 U.S.C. 154(b) by 352 days.

(21) Appl. No.: 12/009,790

(22) Filed: Jan. 22, 2008

(65) Prior Publication Data

US 2008/0121030 A1 May 29, 2008

Related U.S. Application Data

(63) Continuation-in-part of application No. PCT/EP2006/007053, filed on Jul. 27, 2005.

(30) Foreign Application Priority Data

Jul. 27, 2005 (DE) .................. 10 2005 035 786

(51) Int. Cl.
G01B 5/28 (2006.01)
(52) U.S. Cl. .......................... 73/105; 73/104
(58) Field of Classification Search .......... 73/104, 73/105
See application file for complete search history.

(56) References Cited

U.S. PATENT DOCUMENTS

| 1,918,972 | A | * | 7/1933 | King | 369/147 |
|---|---|---|---|---|---|
| 2,329,084 | A | * | 9/1943 | Reason | 73/105 |
| 2,330,801 | A | | 10/1943 | Abbot | |
| 2,345,022 | A | * | 3/1944 | Williamson | 73/105 |
| 2,363,691 | A | * | 11/1944 | Reason | 73/105 |
| 2,471,009 | A | * | 5/1949 | Reason | 73/105 |
| 2,703,007 | A | * | 3/1955 | Brems | 73/105 |
| 2,733,598 | A | * | 2/1956 | Miner | 73/105 |
| 2,772,565 | A | * | 12/1956 | Brown, Jr. et al. | 73/105 |
| 2,789,429 | A | * | 4/1957 | Bidwell | 73/105 |
| 2,841,008 | A | * | 7/1958 | Brems et al. | 73/105 |
| 3,049,002 | A | * | 8/1962 | Hediger | 73/105 |
| 3,087,329 | A | * | 4/1963 | Von Grodek et al. | 73/105 |
| 3,158,022 | A | * | 11/1964 | Rawstron et al. | 73/105 |
| 3,254,530 | A | * | 6/1966 | Ohringer | 73/105 |
| 3,283,568 | A | * | 11/1966 | Reason | 73/105 |
| 4,106,333 | A | * | 8/1978 | Salje et al. | 73/105 |
| 4,552,014 | A | * | 11/1985 | Berchtold | 73/105 |
| 4,574,625 | A | * | 3/1986 | Olasz et al. | 73/105 |
| 4,765,181 | A | * | 8/1988 | Numoto et al. | 73/105 |

(Continued)

FOREIGN PATENT DOCUMENTS

DE         26 40 894 C2       3/1973

(Continued)

*Primary Examiner*—David A. Rogers
(74) *Attorney, Agent, or Firm*—R. S. Lombard; K. Bach

(57) ABSTRACT

In a roughness scanner comprising a scanning arm with a scanning needle mounted at one end thereof, a skid carrier having an end supporting a skid with the scanning arm extending along the skid carrier in spaced relationship therefrom, the skid has at one side a guide late including an opening through which the scanning needle extends and a space formed above the guide plate which space is open at least at one side thereof down to the guide plate, so that any liquid collected by the needle and moving upward into the space above the guide late can flow again out of that space.

14 Claims, 2 Drawing Sheets

U.S. PATENT DOCUMENTS

| | | | | |
|---|---|---|---|---|
| 4,776,212 A | * | 10/1988 | Parsons et al. | 73/105 |
| 4,888,983 A | * | 12/1989 | Dunfield et al. | 73/104 |
| 5,048,326 A | * | 9/1991 | Toida et al. | 73/105 |
| 5,237,860 A | * | 8/1993 | Kato et al. | 73/105 |
| 6,026,678 A | * | 2/2000 | Mamaysky et al. | 73/105 |
| 6,164,124 A | * | 12/2000 | Fujii et al. | 73/105 |
| 6,397,667 B1 | * | 6/2002 | Fujii et al. | 73/105 |
| 6,425,285 B1 | * | 7/2002 | Fujii et al. | 73/104 |
| 6,446,496 B1 | * | 9/2002 | Fujii et al. | 73/105 |
| 6,487,897 B1 | * | 12/2002 | Fujii et al. | 73/105 |

FOREIGN PATENT DOCUMENTS

| | | |
|---|---|---|
| DE | 25 35 912 B2 | 2/1977 |
| DE | 44 37 033 A1 | 4/1996 |
| GB | 2 253 275 A | 9/1992 |

\* cited by examiner

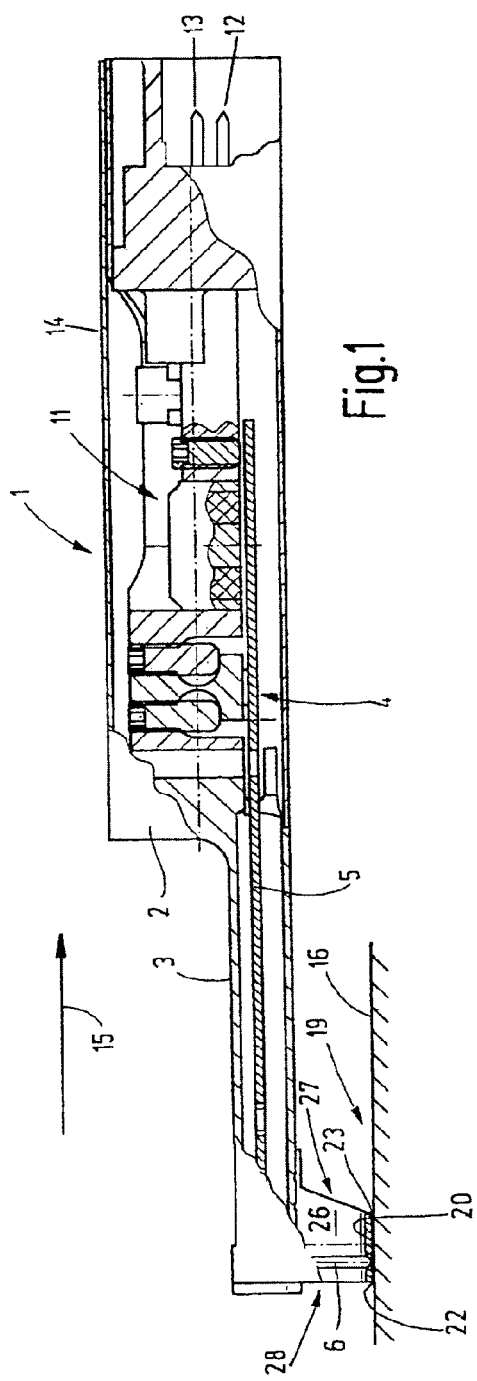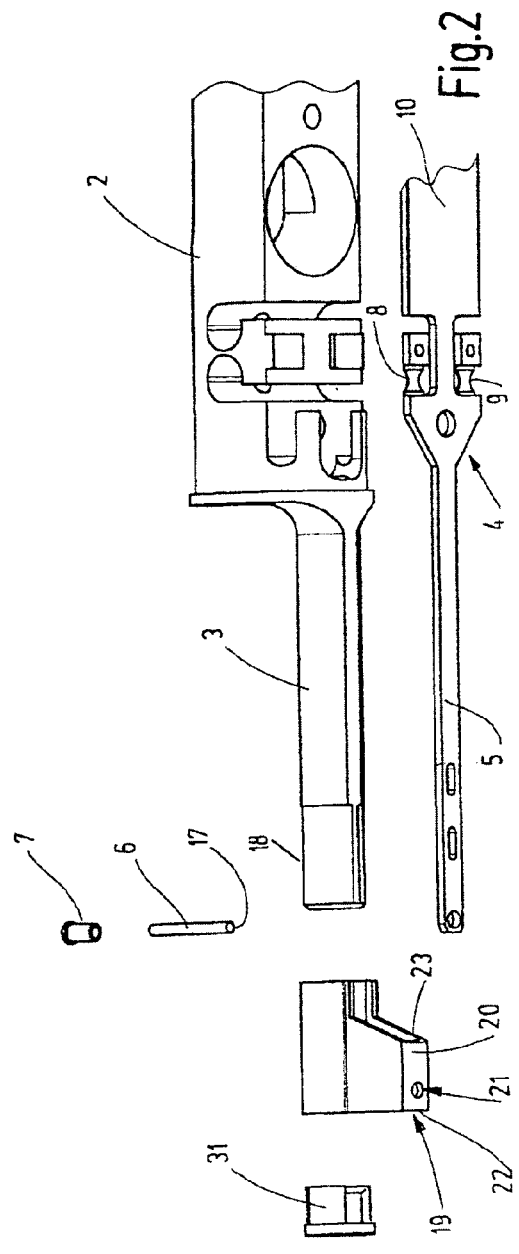

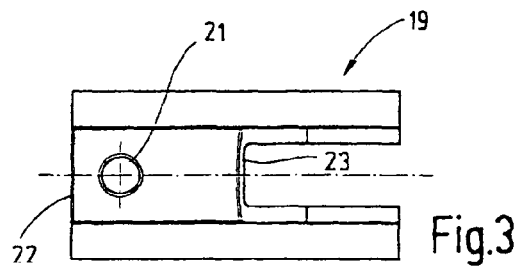
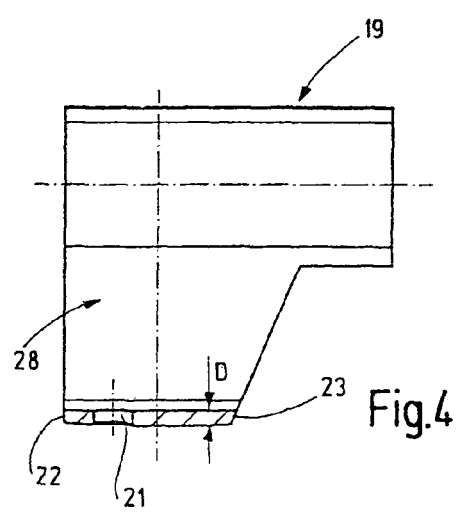
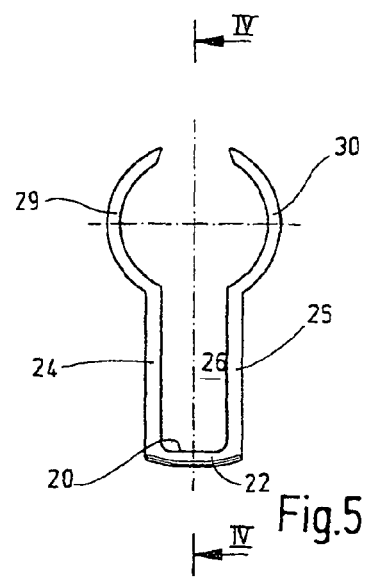
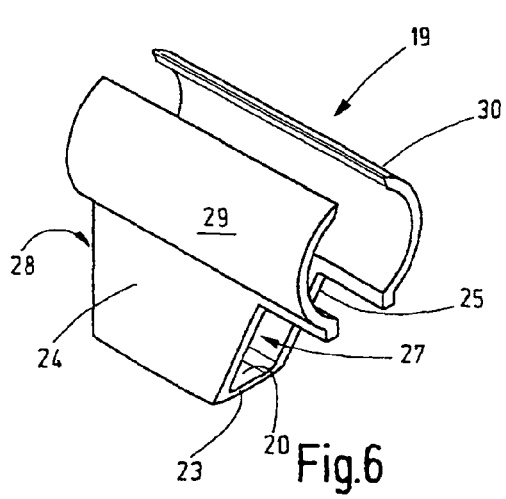
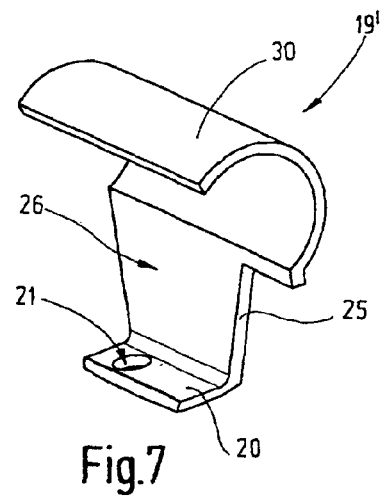

ROUGHNESS SCANNER

CROSS-REFERENCE TO RELATED APPLICATION

This is a continuation-in-part application of pending international application PCT/EP2006/007053 filed Jul. 18, 2006 and claiming the priority of German Application No. 10 2005 035 786.5 filed Jul. 27, 2005.

BACKGROUND OF THE INVENTION

The invention resides in a roughness scanner particularly for industrial applications, but also for laboratory use.

Roughness scanners are used to determine the roughness of a surface. To this end, the roughness scanner includes a skid of a size of a few millimeters which is in contact with the workpiece. A very fine scanner needle extends through an opening in the skid and into contact with the workpiece surface. The vibrations of the scanner needle caused by the roughness of the surface during the skid over the workpiece are picked up just like in a record player and converted into electrical signals and are evaluated for determining a characteristic roughness value.

The scanner needle and the skid are very small components which are also very sensitive. The opening through which the scanner needle extends is, for example, only one millimeter wide or even smaller. Although it is not in compliance with the measuring specifications, the roughness scanners may at times come into contact with oily workpiece surfaces. Such problems occur mainly during use in connection with manufacturing equipment. The oil present on the workpiece surface then accumulates around the scanner needle in the skid opening whereby it is slowly transported by the vibrations of the needle into interior of the roughness scanner. However, because of its viscosity the oil influences the measurements undesirably, so that the measuring results of such a roughness scanner are no longer reliable. It must therefore be flushed out which, because of the small dimensions of the roughness scanner requires special skills. Furthermore, it is difficult to remove solvent or flushing medium from the roughness scanner. They adhere, for example, to the surfaces areas between the skid and the scanner needle because of capillary effects. A visual examination whether the gap around the scanner needle is free from solvents or flushing liquids, washing liquids, oils or similar media, is impossible without magnifier and is even with a magnifier not reliably possible.

It is therefore the object of the present invention to provide a roughness scanner, which is usable reliably also in connection with manufacturing procedures.

SUMMARY OF THE INVENTION

In a roughness scanner comprising a scanning arm with a scanning needle mounted at one end thereof, a skid carrier having an end supporting a skid with the scanning arm extending along the skid carrier in spaced relationship therefrom, the skid has at one side a guide plate including an opening through which the scanning needle extends and a space formed above the guide plate which space is open at least at one side thereof down to the guide plate, so that any liquid collected by the needle and moving upward into the space above the guide plate can flow again out of that space.

Since the opening receiving the scanner needle is open toward the front and/or the rear the cleaning fluid can be admitted to the scanner needle without difficulty and can also be again removed. It is also easily possible to clean the gap formed by the skid around the scanner needle with compressed air.

The capillary effect otherwise present between the scanner needle and the skid opening causes a pumping effect by which otherwise oil is directed into the roughness scanner. This pumping effect is eliminated by the open configuration of the skid. Oil which has entered between the skid and the scanner needle can be discharged again toward the front and the rear. In any case, it is not conducted further into the roughness scanner.

The scanner needle preferably is a diamond tip or a steel needle which is provided with a diamond tip. It extends through the opening provided in the skid without contacting the wall thereof. Preferably the scanner tip narrows down in this area, that is, it has, for example, a cone-like shape.

The plate, which is formed at the skid and though which the scanner needle extends, is preferably slightly arched at it end facing the workpiece. The arch can have a curvature in the direction of movement of the scanner or in a direction transverse to the movement of the scanner. Also, the radii of the curvature may be different. A curvature transverse to the direction of movement makes it possible to hold the roughness scanner at slightly different angles with respect to the workpiece surface. It does not need to be oriented exactly parallel to the workpiece surface. The curvature in the direction of movement is advantageous if concave surface areas such as bare walls are scanned.

The plate is connected to a clamp by at least one, but preferably two, support arms which project from the two long edges of the plate. An upper arched section of each arm forces the clamp for attaching the skid carrier. The space present between the two arms is, with respect to the direction of movement, preferably open toward the front as well as toward the rear. The respective opening extends preferably directly to the plate. Fluids which have entered the space between the arms via the opening provided in the plate can therefore freely flow out again. This reduces the soiling sensitivity of the roughness scanner and facilitates the cleaning thereof.

Further features and advantageous embodiments of the invention will be described below on the basis of the accompanying drawings showing an embodiment of the roughness scanner according to the invention.

BRIEF DESCRIPTION OF THE DRAWINGS

FIG. 1 shows schematically the roughness scanner in a longitudinal cross-sectional view;

FIG. 2 is an exploded perspective view of the roughness scanner according to FIG. 1;

FIG. 3 shows the skid of the roughness scanner according to FIGS. 1 and 2 in a bottom view of the skid;

FIG. 4 shows the skid of FIG. 3 in a longitudinal cross-sectional view;

FIG. 5 is a front view of the skid shown in FIGS. 3 and 4;

FIG. 6 is a perspective view of the skid shown in FIGS. 3 to 5, and;

FIG. 7 shows a modified embodiment of the skid for a roughness scanner according to FIG. 1 in a perspective view.

DESCRIPTION OF PREFERRED EMBODIMENTS

FIG. 1 shows a roughness scanner 1 having a base body 2 provided with a skid carrier 3 in the form of a tube which projects from the base body 2. In place of a tubular skid carrier 3, a skid carrier in the form of a U-profile may be used.

Furthermore, it may be in the form of an oval tube, a circular tube, a rectangular tube or of similar shape. Through the skid carrier 3, a lever arm 5 extends which is part of a scanning arm 4 and which carries at its free end a scanning needle 6. The scanning needle 6 is held in a socket 7 which supports it at the end of the lever arm 5.

The scanning arm 4 is movably supported by the base body 2 via spring joints 8, 9 (FIG. 2) and includes a second lever arm 10 which cooperates with a sensor 11 for picking up movements and position changes of the scanning arm 4. Signals of the sensor 11 can be taken up from the outside via plug-in contact pins 12, 13.

The roughness scanner 1 preferably has a cylindrical outer shape. It is accommodated in a cylindrical housing 14 of an advancing apparatus which is not shown and is movable in a direction as indicated in FIG. 1 by an arrow 15 for the scanning of a workpiece surface. To this end, the scanning needle 6 is provided with a scanning tip 17 which may be, for example, in the form of a diamond tip.

The skid carrier 3 is provided at its end 18 remote from the base body 2 with a skid 19 by way of which the roughness scanner 1 is disposed on the workpiece surface 16. The skid 19 supports the roughness scanner 1 on the workpiece surface 16 and forms the measurement reference for the deflection of the scanning tip 17. At it bottom side, it includes a section in the form of a plate 20 which is polished at the bottom and, as shown in FIGS. 4, 5 and 6, is slightly curved. FIG. 5 shows the curvature in a plane which extends in this case normal to the advancing direction. In this plane the curvature is clearly greater than the curvature shown in FIG. 4 in a plane extending in the advancing direction. The underside of the plate 20 is polished, so that it can slide easily and smoothly across the workpiece surface.

The plate 20 includes an opening 21 whose diameter, as shown in FIG. 4, is substantially greater than the thickness D of the plate 20. The opening 21 is preferably arranged outside the center of the plate 20. It is arranged closer to, with respect to the direction of movement 15, rear edge 22 than to the front edge 23 of the plate 20.

Two essentially parallel legs 24, 25 (FIG. 5 or 6) extend upwardly from the plate 20 so as to form between them a relatively wide space 26. Above, the plate 20, in the direction of movement 15, front edge 23 and also above the rear edge 22 the plate 20 is not provided with upwardly extending legs, that is, the space 26 between the legs 24, 25 is provided toward the front and the rear with openings 27, 28.

The legs 24, 25 form at their upper ends clamping members 29, 30 in the form of sleeve members of semi-circular cross-section by which the skid 19 is engaged with the skid carrier 3.

For additional mounting of the skid 19 to the skid carrier 3, a clamping piece 31 may be inserted into the end opening between the clamping members 29, 30 as approved from FIG. 2, which closes the skid carrier of the end like a plug.

The roughness scanner 1 as described above operates as follows:

During operation, the roughness scanner 1 is pulled in the advancing direction 15 over the workpiece surface 16. The skid 19 slides herein with the lower arched and polished surface of the plate 20 over the workpiece surface 16. At the same time, the scanning tip 17 scans the workpiece surface whereby the scanning needle 6 is subjected to microscopic movements normal to the workpiece surface 6. The small pivot movements of the scanning arm 4 are detected by the sensor 11 and converted to electric signals which can be picked up. Any liquids present on the workpiece surface such as oil or oil residues may collect on the needle whereby the annular gap formed between the needle tip 17 and the wall of the opening 21 may be filled with the respective liquid. With additional accumulation, such liquids finally overflow over the top of the opening 21 and spread out on the top side of the plate 20. However, there is no further accumulation. The liquids then can freely flow out via the rear and front edges 22, 23. In any case, liquids will not move up along the scanning needle 6 and enter the skid carrier 3.

If it should become necessary to clean the roughness scanner 1, it can easily be brushed with a cleaning liquid or a cleaning liquid may be sprayed onto it or it may be immersed into a cleaning liquid. It is also possible to spray cleaning liquids through the openings 27, 28 onto the scanning needle 6 and flush them out again or blow them out again by compressed air. Also, liquids collected on the scanning needle 6 during scanning such as oils may be directly blown out by compressed air.

FIG. 7 shows a modified embodiment of a skid 19'. Based on the same reference numerals, the earlier description applies also to this embodiment. However, other then described earlier, the skid 19' includes a space 26 which is not only open toward the opposite front and rear ends, but toward three sides. The plate 20 is only supported by the leg 25; the leg 24 is omitted. The clamping member 30 is enlarged, so that it alone is sufficient for supporting the skid 19'. It may, for example, extend over more than 180° around the skid carrier 3. In this embodiment, the space 26 around the needle 6 is particularly well accessible. The opening 21 may be a bore as shown or, alternatively, it may be a passage in another form, for example, in the form of a slit. Such a slit may extend longitudinally or transverse to the advancing direction 15. The same applies to the skid 19.

The roughness scanner 1 according to the invention includes a skid 19 which at least includes a relatively large opening 27 and/or 28 arranged above a plate 20 forming the actual skid structure and extending directly from the plate 20. The scanning needle 6 extends at a relatively large distance from the walls 24, 25 defining the space between the legs 26 so that no capillary effects are present. Only between the wall of the opening 21 in the plate 20 a narrow annular gap is formed around the needle 6. Liquids reaching this annular gap however are again conducted out as soon as they reach the space 26 between the legs 24, 25. The liquids will not enter the interior of the roughness scanner 1.

What is claimed is:

1. A roughness scanner (1) in movable scanning relationship with a workpiece surface (16) in an advancing direction (15), comprising:

a scanning arm (4) having a scanning needle (6) mounted at one end thereof, a skid carrier (3) having an end (18) supporting a skid (10) with the scanning arm (4) extending along the skid carrier (3), the skid (19) being arranged so as to form a space (26) between the skid carrier (3) and the skid (19) being delimited at least at one side by a guide plate (20) having an opening (21) through which the scanning needle (6) extends, said space (26) being fully open above the guide plate (20) at least toward one side disposed in the advancing direction (15) and/or disposed in opposition to the advancing direction (15).

2. The roughness scanner according to claim 1, wherein the scanning needle (6) is formed by, or is provided with, a diamond tip (17).

3. The roughness scanner according to claim 1, wherein the guide plate (20) is curved at its side remote from the space (26).

4. The roughness scanner according to claim 1, wherein the guide plate (20) is polished at its side remote from the space (26).

5. The roughness scanner according to claim 1, wherein the opening (21) of guide plate (20) is circular and has a diameter which is larger than that of the scanning needle and the scanning needle (6) extends through the opening (21) without contact.

6. The roughness scanner according to claim 1, wherein the guide plate (20) has a thickness which is smaller than the diameter of the opening (21) in the guide plate (20).

7. The roughness scanner according to claim 1, wherein the part of the scanning needle (6) extending through the opening (21) of guide plate (20) is pointed.

8. The roughness scanner according to claim 1, wherein the guide plate (20) is connected to a clamping structure (29) by at least one support leg (24).

9. The roughness scanner according to claim 1, wherein the guide plate (20) is provided with two spaced essentially parallel legs (24, 25) which are connected to a clamping structure (29, 30).

10. The roughness scanner according to claim 9, wherein between the legs (24, 25) an opening (28) is provided.

11. The roughness scanner according to claim 10, wherein the opening (28) extends down to the guide plate (20) so that the space (26) between the legs (24, 25) is open down to the guide plate (20).

12. The roughness scanner according to claim 10, wherein the space (26) between the legs (24, 25) is open at least at two sides in addition to an upper side.

13. The roughness scanner according to claim 10, wherein the space (26) between the legs (24, 25) is open at opposite sides in addition to an upper side.

14. The roughness scanner according to claim 10, wherein the space (26) between the legs (24, 25) is open towards three sides in addition to an upper side.

* * * * *